United States Patent
Kim et al.

(10) Patent No.: US 10,340,565 B2
(45) Date of Patent: Jul. 2, 2019

(54) BATTERY CELL ASSEMBLY WITH IMPROVED COOLING EFFICIENCY

(71) Applicant: LG CHEM, LTD., Seoul (KR)

(72) Inventors: Tae-Wook Kim, Daejeon (KR); Bok-Gun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 3 days.

(21) Appl. No.: 15/538,379

(22) PCT Filed: Jun. 20, 2016

(86) PCT No.: PCT/KR2016/006534
§ 371 (c)(1),
(2) Date: Jun. 21, 2017

(87) PCT Pub. No.: WO2016/208925
PCT Pub. Date: Dec. 29, 2016

(65) Prior Publication Data
US 2017/0352934 A1 Dec. 7, 2017

(30) Foreign Application Priority Data

Jun. 26, 2015 (KR) .......................... 10-2015-0091381

(51) Int. Cl.
*H01M 10/613* (2014.01)
*H01M 10/6551* (2014.01)
(Continued)

(52) U.S. Cl.
CPC ..... *H01M 10/6551* (2015.04); *H01M 10/613* (2015.04); *H01M 10/6556* (2015.04); *H01M 2/1077* (2013.01); *H01M 10/0486* (2013.01)

(58) Field of Classification Search
CPC .......... H01M 2/1077; H01M 10/0486; H01M 10/613; H01M 10/6551; H01M 10/6556
See application file for complete search history.

(56) References Cited

U.S. PATENT DOCUMENTS

| | | | |
|---|---|---|---|
| 2013/0266838 A1* | 10/2013 | Von Borck | F28F 3/12 429/120 |
| 2014/0000846 A1 | 1/2014 | Kim et al. | |
| 2016/0049705 A1* | 2/2016 | Mahe | H01M 10/625 429/120 |

FOREIGN PATENT DOCUMENTS

| | | |
|---|---|---|
| JP | 2006-210245 A | 8/2006 |
| JP | 2008-181734 A | 8/2008 |

(Continued)

OTHER PUBLICATIONS

"Insert." Dictionary.com, Dictionary.com, www.dictionary.com/browse/insert?s=ts. Accessed on: Aug. 15, 2018. (Year: 2018).*

(Continued)

*Primary Examiner* — Edu E. Enin-Okut
(74) *Attorney, Agent, or Firm* — Birch, Stewart, Kolasch & Birch, LLP (57) ABSTRACT

Disclosed is a battery cell assembly with improved cooling efficiency. The battery cell assembly includes a cooling fin having a tube through which a coolant flows; at least one frame member; at least one battery cell disposed to face the cooling fin; a first cooling port welded to an inlet formed at one end of the tube of the cooling fin; and a second cooling port welded to an outlet formed at the other end of the tube of the cooling fin. The first cooling port and the second cooling port are made of the same material as the tube.

9 Claims, 6 Drawing Sheets

(51) Int. Cl.
    *H01M 10/6556*    (2014.01)
    *H01M 2/10*    (2006.01)
    *H01M 10/04*    (2006.01)

(56) References Cited

FOREIGN PATENT DOCUMENTS

| | | |
|---|---|---|
| JP | 2009-301877 A | 12/2009 |
| KR | 10-2012-0069567 A | 6/2012 |
| KR | 10-2013-0078520 A | 7/2013 |
| KR | 10-2013-0112117 A | 10/2013 |
| KR | 20130112117 A * | 10/2013 |

OTHER PUBLICATIONS

Machine Translation for KR 20130112117 A. (Year: 2018).*
International Search Report (PCT/ISA/210) issued in PCT/KR2016/006534, dated Oct. 4, 2016.

* cited by examiner

BATTERY CELL ASSEMBLY WITH IMPROVED COOLING EFFICIENCY

TECHNICAL FIELD

The present application claims priority to Korean Patent Application No. 10-2015-0091381 filed on Jun. 26, 2015 in the Republic of Korea, the disclosures of which are incorporated herein by reference.

The present disclosure relates to a battery cell assembly, and more particularly, to a battery cell assembly with improved cooling efficiency.

BACKGROUND ART

A secondary battery which has ease with applicability for various product groups and good electric characteristics such as high energy density is universally applied not only to portable devices but also electric vehicles (EV), hybrid electric vehicles (HEV), energy storage systems or the like, which are driven by an electric source. The secondary battery has a primary advantage of greatly reducing the use of fossil fuels and a secondary advantage of generating no byproduct after the use of energy, and thus the secondary battery receives attention as a new energy source which is environment-friendly and promotes energy efficiency.

A battery pack applied to an electric vehicle or the like includes a plurality of cell assembly connected in series, each cell assembly having a plurality of unit cells, in order to obtain high output. In addition, the unit cell includes positive and negative electrode current collectors, a separator, active materials, an electrolyte or the like and is capable of being repeatedly charged and discharged by means of electrochemical reactions among the components.

In addition to such a basic structure, the battery pack may additionally include a battery management system (BMS) for monitoring and controlling a state of the secondary battery by applying an algorithm for controlling a power supplied to a driving load such as a motor, measuring electric characteristic values of current or voltage, controlling charge/discharge, controls voltage equalization, estimating a state of charge (SOC), or the like.

Meanwhile, recently, as the necessity for a large-capacity structure to be utilized as an energy storage is increasing, the demand for a battery pack having a multi-module structure in which a plurality of modules, each having a plurality of secondary batteries connected in series and/or in parallel, are aggregated is also increasing.

In the battery pack of a multi-module structure, a plurality of secondary batteries are densely arranged in a narrow space, and thus it is important to easily emit heat generated from each secondary battery. Japanese Unexamined Patent Publication No. 2009-301877 discloses an indirect cooling method, as one of various methods for emitting the heat generated from a secondary battery.

In the indirect cooling method, a cooling fin in contact with a package material of a secondary battery is cooled by means of a coolant. The heat generated from a secondary battery is transferred through the cooling fin, and the cooling fin transfers the heat to the coolant again, thereby preventing the secondary battery from being heated. The cooling fin is coupled to a frame and disposed at a battery system.

However, if the cooling fin and the frame are made of different materials, a coupling region between the cooling fin and the frame may cause a leakage, which may cause leakage of a part of the coolant, and thus resultantly the secondary battery may be heated.

DISCLOSURE

Technical Problem

The present disclosure is designed to solve the problems of the related art, and therefore the present disclosure is directed to providing a battery cell assembly with improved cooling efficiency, employed at a battery system, by eliminating a leakage phenomenon occurring when a tube and a frame are coupled.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery cell assembly, comprising: a cooling fin having a tube through which a coolant flows; at least one frame member; at least one battery cell disposed to face the cooling fin; a first cooling port welded to an inlet formed at one end of the tube of the cooling fin; and a second cooling port welded to an outlet formed at the other end of the tube of the cooling fin, wherein the first cooling port and the second cooling port are made of the same material as the tube.

The cooling fin may have a first through hole in which the first cooling port is accommodated and through which the inlet is exposed and a second through hole in which the second cooling port is accommodated and through which the outlet is exposed.

Also, the inlet exposed through the first through hole may be inserted into a hole formed in the first cooling port and welded thereto, and the outlet exposed through the second through hole may be inserted into a hole formed in the second cooling port and welded thereto.

Each of the first cooling port and the second cooling port may include a head portion and a body portion, the body portion of the first cooling port may be accommodated in the first through hole so that the inlet is inserted into a hole formed in the body portion and welded thereto, and the body portion of the second cooling port may be accommodated in the second through hole so that the outlet is inserted into a hole formed in the body portion and welded thereto.

Meanwhile, the head portion of the first cooling port may be welded to the cooling fin, and the head portion of the second cooling port may be welded to the cooling fin.

A diameter of the head portion of the first cooling port may be greater than a diameter of the first through hole, and a diameter of the head portion of the second cooling port may be greater than a diameter of the second through hole.

The inlet and the first cooling port may be welded by means of brazing, and the outlet and the second cooling port may be welded by means of brazing.

In addition, the cooling fin may be formed by welding a first cooling fin and a second cooling fin, each having a semi-cylindrical tube, by means of brazing.

The first cooling port, the second cooling port and the tube may be made of aluminum.

Advantageous Effects

In the present disclosure, since a cooling port made of the same material as the tube is welded to a cooling fin by means of brazing and the welded cooling fin is coupled to the frame member, it is possible to prevent an peeling phenomenon occurring at a boundary of different materials and thus block leakage of the coolant.

In addition, in the present disclosure, since a coolant leakage phenomenon occurring at an existing battery system is perfectly eliminated, a battery system may be maintained stably.

Further, in the present disclosure, since the cooling fin and the cooling port are welded by means of brazing, the cooling fin and the cooling port may be sealed more efficiently.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
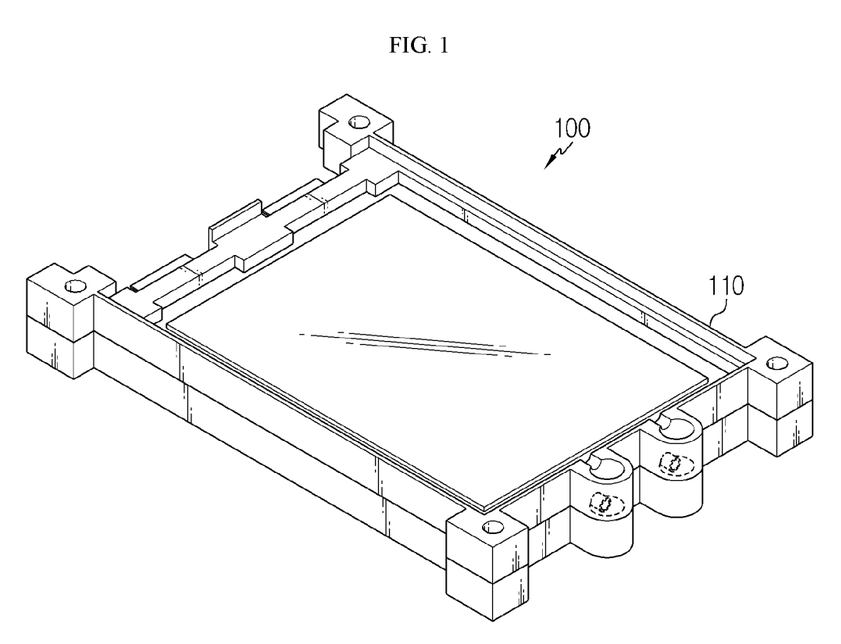
FIG. 1 is a diagram showing an existing battery cell assembly to which a cooling fin and a frame member are coupled.

FIG. 1 is a diagram showing an existing battery cell assembly 100 to which a cooling fin and a frame member are coupled.

Figure 2:
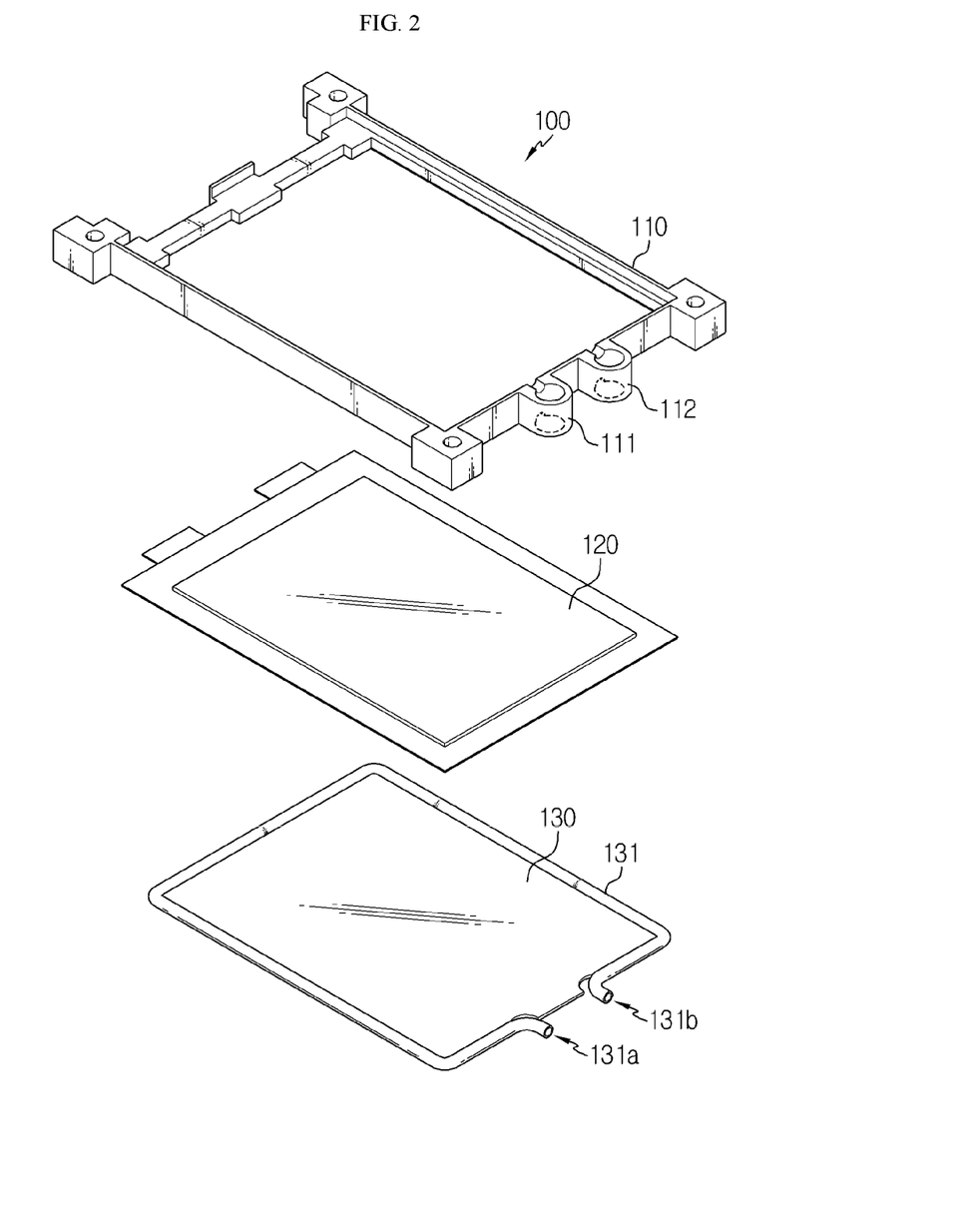
FIG. 2 is an exploded view showing the existing battery cell assembly.

FIG. 2 is an exploded view showing the existing battery cell assembly 100.

Referring to FIGS. 1 and 2, a battery cell 120 is disposed between a cooling fin 130 and a frame member 110.

The cooling fin 130 has a tube 131 through which a coolant flows. An inlet 131a at which the coolant flows in and an outlet 131b at which the coolant flows out are formed at the tube 131. The tube 131 is made of aluminum, and the frame member 110 is made of plastic.

The cooling fin 130 is coupled to the frame member 110 by means of over-molding. In other words, the inlet 131a of the cooling fin 130 is over-molded to a first molding portion 111 of the frame member 110, and the outlet 131b of the cooling fin 130 is over-molded to a second molding portion 112 of the frame member 110.

However, if the tube 131 made of aluminum is over-molded to the frame member 110 made of plastic, since the tube 131 and the frame member 110 have different thermal expansion coefficients, a leakage may occur at a boundary of the tube 131 and the frame member 110. If a leakage occurs as above, the coolant may partially flow through the leakage, and resultantly a secondary battery may be heated.

Figure 3:
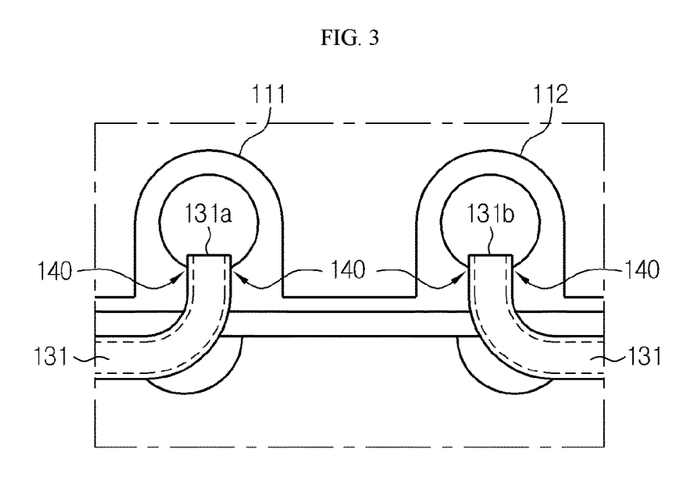
FIG. 3 is a cross-sectional view showing a frame member and a tube which are over-molded.

FIG. 3 is a cross-sectional view showing a frame member 110 and a tube 131 which are over-molded.

As shown in FIG. 3, the tube 131 made of aluminum is over-molded to the frame member 110 made of plastic. However, since the tube 131 and the frame member 110 have different thermal expansion coefficients, a leakage may occur at a boundary 140 of the tube 131 and the frame member 110. If a leakage occurs as above, the coolant may partially flow out at the boundary 140.

Figure 4:
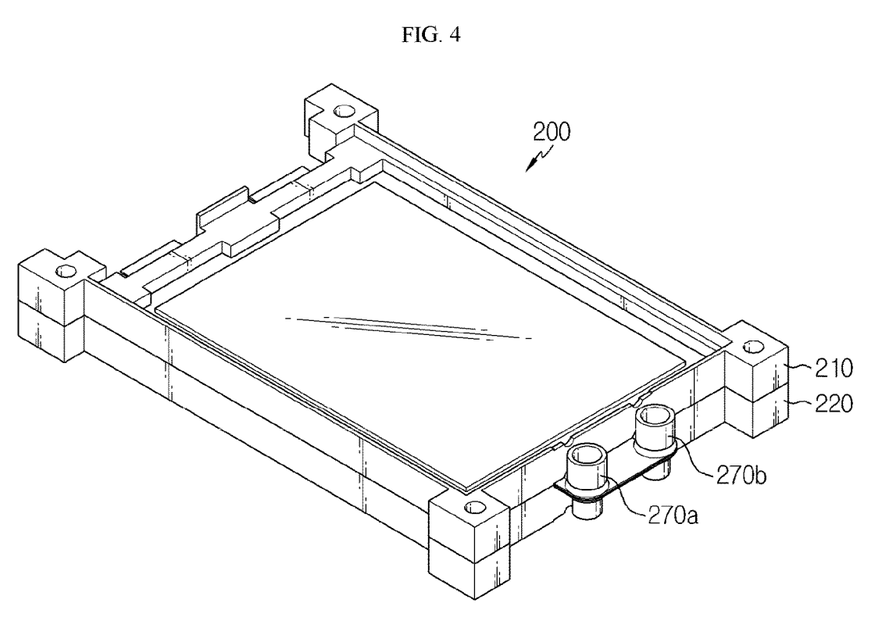
FIG. 4 is a diagram showing a battery cell assembly according to an embodiment of the present disclosure.

FIG. 4 is a diagram showing a battery cell assembly according to an embodiment of the present disclosure.

Figure 5:
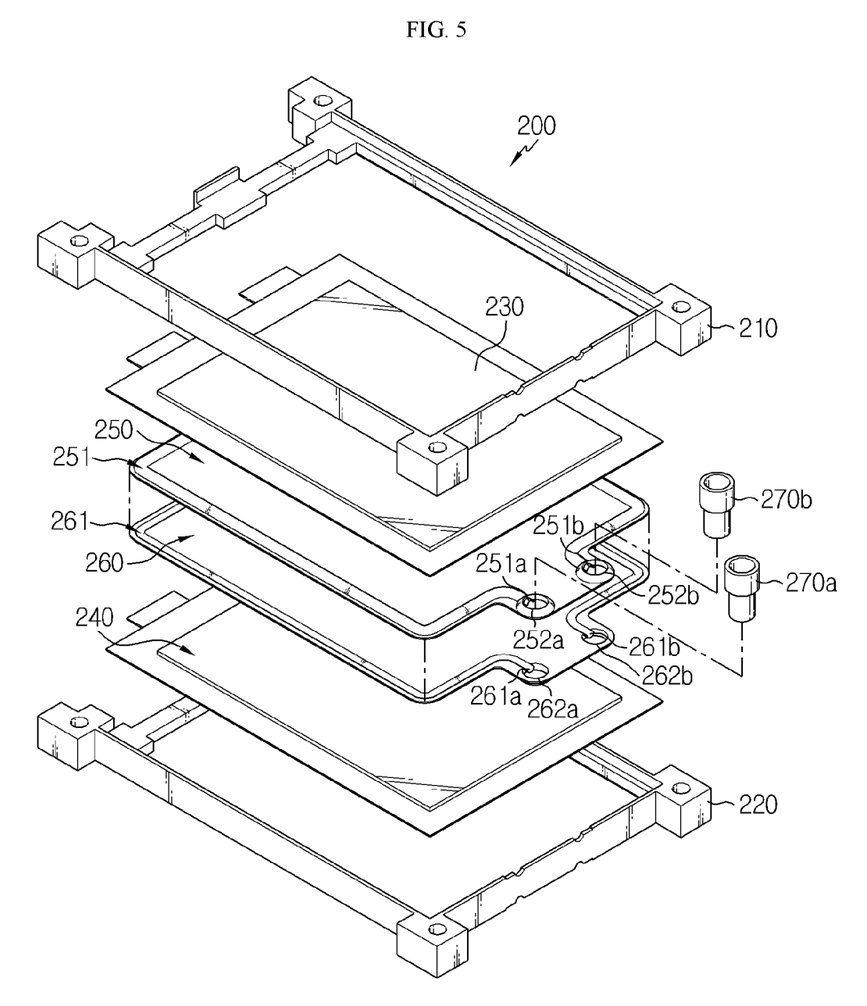
FIG. 5 is an exploded view showing a battery cell assembly according to an embodiment of the present disclosure.

FIG. 5 is an exploded view showing a battery cell assembly according to an embodiment of the present disclosure.

Figure 6:
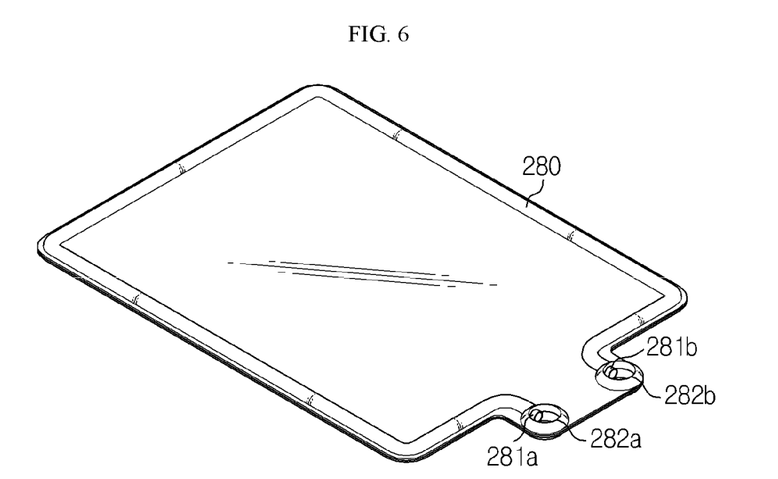
FIG. 6 is a diagram showing a cooling fin welded by means of brazing according to an embodiment of the present disclosure.

FIG. 6 is a diagram showing a cooling fin welded by means of brazing according to an embodiment of the present disclosure.

Referring to FIGS. 4 to 6, a battery cell assembly 200 includes frame members 210, 220, battery cells 230, 240, cooling fins 250, 260, and a plurality of cooling ports 270a, 270b welded to the cooling fins 250, 260 by means of brazing.

The frame members 210, 220 couples and fixes the battery cells 230, 240 and the cooling fins 250, 260 to each other. The first frame member 210 and the second frame member 220 are coupled to each other by means of fitting and may fix the cooling fins 250, 2604 battery cells 230, 240 disposed between the first frame member 210 and the second frame member 220.

In an embodiment of the present disclosure, the frame members 210, 220 are made of plastic. However, in another embodiment, the frame members 210, 220 may also be made of other materials known in the art.

Each of the battery cells 230, 240 generates an operating voltage. In an embodiment of the present disclosure, each of the battery cells 230, 240 is a pouch-type lithium-ion battery cell. Other types of battery cells known in the art may also be used. The battery cells 230, 240 may be electrically connected in series to each other. Each of the battery cells 230, 240 includes a rectangular pouch and electrodes extending from the pouch. Each of the battery cells 230, 240 is disposed in the battery cell assembly 200 to face the first cooling fin 250 or the second cooling fin 260. In other words, the first battery cell 230 is located between the first frame member 210 and the first cooling fin 250, and the second battery cell 240 is located between the second frame member 220 and the second cooling fin 260.

Even though it has been described that two battery cells 230, 240 are included in the battery cell assembly 200 in this embodiment, a single battery cell may be included in the battery cell assembly 200, and three or more battery cells may also be included in the battery cell assembly 200.

The cooling fins 250, 260 transfer thermal energy of the battery cells 230, 240 to the coolant to cool the battery cells 230, 240.

The cooling fins 250, 260 include a rectangular aluminum plate and semi-cylindrical tubes 251, 261. In addition, at least one of the cooling fins 250, 260 may include a thermal conductive sheet. In other words, a thermal conductive sheet may be provided to any one of the first cooling fin 250 and the second cooling fin 260, or a thermal conductive sheet may also be provided to each of the first cooling fin 250 and the second cooling fin 260. The thermal conductive sheet is formed at one surface of the cooling fin at which a tube is not formed, to absorb heat of the battery cells 230, 240. In other words, the semi-cylindrical tube 251 is adhered to a lower surface of the first cooling fin 250, and the thermal conductive sheet is adhered to an upper surface of the first cooling fin 250. In addition, if the semi-cylindrical tube 261 is formed at an upper surface of the second cooling fin 260, the thermal conductive sheet is adhered to a lower surface of the first cooling fin 260. The thermal conductive sheet has excellent thermal characteristics of transferring the heat energy generated from the battery cells 230, 240.

The semi-cylindrical tubes 251, 261 respectively formed at the cooling fins 250, 260 are made of aluminum and located at rims of the cooling fins 250, 260.

In addition, a through hole is formed in each of the first cooling fin 250 and the second cooling fin 260. In other words, an inlet 251a of the tube 251 and a through hole 252a serving as a space where the first cooling port 270a is welded by means of brazing are formed in the first cooling fin 250. At an inner circumference of the through hole 252a, a starting end of the semi-cylindrical tube 251, namely the inlet 251a, is exposed. In addition, an outlet 251b of the tube 251 and a through hole 252b serving as a space where the second cooling port 270b is welded by means of brazing welding are formed in the first cooling fin 250, and at an inner circumference of the through hole 252b, a final end of the semi-cylindrical tube 251, namely the outlet 251b, is exposed.

Similarly, an inlet 261a of the tube 261 and a through hole 262a serving as a space where the first cooling port 270a is welded by means of brazing are formed in the second cooling fin 260. At an inner circumference of the through hole 262a, a starting end of the semi-cylindrical tube 261, namely the inlet 261a, is exposed. In addition, an outlet 262a and a through hole 262b allowing the second cooling port 270b to be welded by means of brazing are formed in the second cooling fin 260, and at an inner circumference of the through hole 262b, a final end of the semi-cylindrical tube 261, namely the outlet 262b, is exposed.

If the first cooling fin 250 and the second cooling fin 260 are welded by means of brazing, the first semi-cylindrical tube 251 and the second semi-cylindrical tube 261 are coupled, so that a tube 280 having a cylindrical shape and serving as a space where the coolant flows is formed at the completely welded cooling fin. Also, and a cylindrical inlet 281a and a cylindrical outlet 281a are formed at the completely welded cooling fin.

Referring to FIG. 6, since the lower surface of the first cooling fin 250 and the upper surface of the second cooling fin 260 are welded by means of brazing, the first semi-cylindrical tube 251 and the second semi-cylindrical tube 261 are coupled to form a cylindrical tube 280 serving as a passage through which the coolant flows. In addition, since the lower surface of the first cooling fin 250 and the upper surface of the second cooling fin 260 are welded by means of brazing, the cylindrical inlet 281a is exposed at a welded through hole 282a, and a cylindrical outlet 281b is exposed at a welded through hole 282b. In other words, at the completely welded cylindrical tube 280, the inlet 281a at which the coolant flows in is exposed at the through hole 282a, and the outlet 281b at which the coolant flows out is exposed at the through hole 282b. The coolant flowing out of the cylindrical tube 280 is stored in a predetermined storage unit.

The cylindrical inlet 281a and the cylindrical outlet 282b formed by means of brazing are respectively welded to the first cooling port 270a and the second cooling port 270b by means of brazing.

Figure 7:
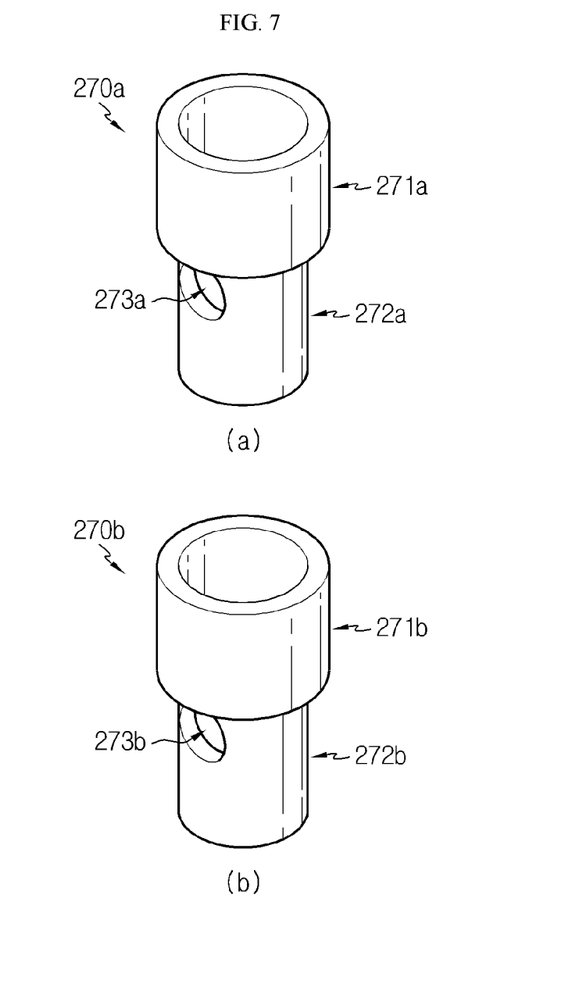
FIG. 7 is a perspective view showing a cooling port according to an embodiment of the present disclosure.

FIG. 7 is a perspective view showing a cooling port according to an embodiment of the present disclosure.

As shown in FIG. 7, the cooling ports 270a, 270b are respectively composed of head portions 271a, 271b and body portions 272a, 272b, and the head portions 271a, 271b have an outer diameter greater than the outer diameter of the body portions 272a, 272b. In addition, the outer diameter of the body portions 272a, 272b is equal to or smaller than the inner diameter of the through holes 281a, 281b.

Moreover, each of the cooling ports 270a, 270b has a passage formed therein so that the coolant may flow therethrough. In addition, one end of each of the cooling ports 270a, 270b is opened so that the coolant may flow in or out therethrough, and the other end is closed so that the coolant does not flow out.

Due to the above structure of the cooling ports 270a, 270b, the body portions 272a, 272b of the cooling ports 270a, 270b are respectively accommodated in the completely welded through holes 282a, 282b, but the head portions 271a, 271b are respectively located on the through holes 282a, 282b.

The body portion 272a of the first cooling port 270a has a hole 273a into which the brazed cylindrical inlet 281a may be inserted, and the body portion 272b of the second cooling port 270b has a hole 273b into which the brazed cylindrical outlet 281b may be inserted. The holes 273a, 273b are formed corresponding to the size of the cylindrical tube 280. In other words, the holes 273a, 273b have substantially the same diameter as the diameter of the cylindrical tube 280.

The first cooling port 270a and the second cooling port 270b are made of aluminum, identical to the tubes. However, in another embodiment, the cooling ports 270a, 270b may be made of other materials well known in the art. For example, if the tubes 250, 260 are made of any material other than aluminum, the cooling ports 270a, 270b may also be made of the same material as the tubes 250, 260. In addition, the shape of the cooling ports 270a, 270b depicted in FIG. 7 is just an example of the present disclosure, and the shape of the cooling ports 270a, 270b and the location of the holes 273a, 273b may be changed as desired by those skilled in the art.

If the first cooling fin 250 and the second cooling fin 260 are completely welded by means of brazing, the body portion 272a of the first cooling port 270a is accommodated in the welded cylindrical through hole 282a, and in a state where the cylindrical inlet 281a is inserted into the hole 273a of the first cooling port 270a, the inner circumference of the hole 273a of the first cooling port 270a is welded to the cylindrical inlet 281a by means of brazing.

In addition, the body portion 272b of the second cooling port 270b is accommodated in the cylindrical through hole 282b, and in a state where the cylindrical outlet 281b is inserted into the hole 273b of the second cooling port 270b, the inner circumference of the hole 272b of the second cooling port 270b is welded to the outer circumference of the cylindrical outlet 281b by means of brazing.

In order to fix the cooling ports 270a, 270b more robustly, the lower surface of the head portion 271a of the first cooling port 270a may be welded to the upper surface of the first cooling fin 250 by means of brazing, and also, the lower surface of the head portion 271b of the second cooling port 270b may also be welded to the upper surface of the first cooling fin 250 by means of brazing.

The cylindrical tube 280 formed by means of such brazing welding absorbs thermal energy of the battery cells 230, 240 by using the coolant introduced through the first cooling port 270a, circulates the coolant and discharges the coolant to a designated area through the second cooling port 270b. In other words, the coolant flowing through the cylindrical tube 280 absorbs thermal energy from the battery cells 230, 240 to lower the temperature of the battery cells 230, 240.

In this embodiment, since the cooling ports 270a, 270b and the tubes 250, 260 are made of the same material, the coupled portions of the tubes 250, 260 and the cooling ports 270a, 270b welded by means of brazing have the same thermal expansion coefficient. Accordingly, a leakage caused by different thermal expansion coefficients may be prevented.

Meanwhile, even though it has been illustrated in this embodiment that the first cooling fin 250 and the second cooling fin 260 are firstly welded by means of brazing and then welded to the cooling ports 270a, 270b by means of brazing, the first cooling fin 250, the second cooling fin 260, and a plurality of cooling ports 270a, 270b may be welded at the same time by means of brazing.

In addition, even though it has been illustrated in this embodiment that the tube has a cylindrical shape, in the present disclosure, the shape of the tube may be modified, and due to the modified shape of the tube, the shape of the hole in the cooling port may also be changed.

Meanwhile, if the cooling fin as shown in FIG. 6 is prepared in advance, the process of welding the first cooling fin 250 and the second cooling fin 260 by means of brazing may be not performed. In other words, if a cooling fin including a cylindrical tube, rather than semi-cylindrical tubes, is fabricated in advance, the process of welding the first cooling fin 250 and the second cooling fin 260 by means of brazing may be not performed.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery cell assembly, comprising:
   a cooling fin having a tube through which a coolant flows;
   at least one frame member;
   at least one battery cell disposed to face the cooling fin;
   a first cooling port welded to an inlet formed at one end of the tube of the cooling fin, the first cooling port having a first end and a second end; and
   a second cooling port welded to an outlet formed at the other end of the tube of the cooling fin, the second cooling port having a first end and a second end,
   wherein the first cooling port and the second cooling port are made of the same material as the tube,
   wherein the cooling fin has a first through hole defined by a sidewall in which a portion of the first cooling port is accommodated and from which a portion of the inlet extends and a second through hole defined by a sidewall in which a portion of the second cooling port is accommodated and from which a portion of the outlet extends, and
   wherein the portion of the inlet is inserted into a hole spaced along an axis of the first cooling port between the first and second ends of the first cooling port and welded thereto, and the portion of the outlet is inserted into a hole spaced along an axis of the second cooling port between the first and second ends of the second cooling port and welded thereto.

2. The battery cell assembly according to claim 1, wherein each of the first cooling port and the second cooling port includes a head portion and a body portion, the body portion of the first cooling port having the hole spaced along the axis of the first cooling port, the body portion of the second cooling port having the hole spaced along the axis of the second cooling port, the body portion of the first cooling port is accommodated in the first through hole so that the portion of the inlet is inserted into the hole spaced along the axis of the first body portion and welded thereto, and the body portion of the second cooling port is accommodated in the second through hole so that the portion of the outlet is inserted into the hole spaced along the axis of the second body portion and welded thereto.

3. The battery cell assembly according to claim 2, wherein the head portion of the first cooling port is welded to the cooling fin, and the head portion of the second cooling port is welded to the cooling fin.

4. The battery cell assembly according to claim 2, wherein a diameter of the head portion of the first cooling port is greater than a diameter of the first through hole, and a diameter of the head portion of the second cooling port is greater than a diameter of the second through hole.

5. The battery cell assembly according to claim 1, wherein the portion of the inlet and the first cooling port are welded by means of brazing, and the portion of the outlet and the second cooling port are welded by means of brazing.

6. The battery cell assembly according to claim 1, wherein the cooling fin is formed by welding a first cooling fin and a second cooling fin, each of the first cooling fin and the second cooling fin having a semi-cylindrical tube, by means of brazing such that the semi-cylindrical tubes define the tube.

7. The battery cell assembly according to claim 1, wherein the first cooling port, the second cooling port and the tube are made of aluminum.

8. The battery cell assembly according to claim 1, wherein the tube is configured to transfer a thermal energy generated at a battery cell to the coolant.

9. A battery cell assembly, comprising:
   a cooling fin having a tube through which a coolant flows;
   at least one frame member;
   at least one battery cell disposed to face the cooling fin;
   a first cooling port welded to an inlet formed at one end of the tube of the cooling fin; and
   a second cooling port welded to an outlet formed at the other end of the tube of the cooling fin,
   wherein the first cooling port and the second cooling port are made of the same material as the tube,
   wherein each of the first cooling port and the second cooling port includes a head portion having a first diameter and a body portion having a second diameter, and the first diameter is greater than the second diameter, wherein the cooling fin has a first through hole defined by a sidewall in which the body portion of the first cooling port is accommodated therein and a second through hole defined by a sidewall in which the body portion of the second cooling port is accommodated therein, wherein a portion of the inlet extends from the sidewall of the first through hole and a portion of the outlet extends from the sidewall of the second through hole, and wherein the portion of the inlet is inserted into a hole formed in the first body portion and welded thereto, and the portion of the outlet is inserted into a hole formed in the second body portion and welded thereto.

\* \* \* \* \*